United States Patent
Wieszt (12)

(10) Patent No.: US 6,318,097 B1
(45) Date of Patent: Nov. 20, 2001

(54) METHOD FOR MONITORING THE REFRIGERANT LEVEL IN AN AIR CONDITIONER

(75) Inventor: Herbert Wieszt, Grafenau (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/618,517

(22) Filed: Jul. 18, 2000

(30) Foreign Application Priority Data

Jul. 27, 1999 (DE) ............................................. 199 35 269

(51) Int. Cl.[7] ..................................................... F25B 49/02
(52) U.S. Cl. ................................................ 62/126; 62/129
(58) Field of Search ............................. 62/126, 129, 125, 62/127

(56) References Cited

U.S. PATENT DOCUMENTS

| | | | |
|---|---|---|---|
| 5,239,865 | * 8/1993 | Salzer et al. | ...................... 62/129 X |
| 5,398,516 | * 3/1995 | Kuribara et al. | ........................ 62/129 |
| 5,647,222 | * 7/1997 | Sarakinis | .............................. 62/126 X |
| 5,987,903 | * 11/1999 | Bathla | ................................. 62/126 X |

FOREIGN PATENT DOCUMENTS 44 01 415 C 1    1/1994 (DE) .

* cited by examiner

*Primary Examiner*—Harry B. Tanner
(74) *Attorney, Agent, or Firm*—Mark P. Calcaterra

(57) ABSTRACT

The invention relates to a method for monitoring the refrigerant level in an air conditioner, in particular a motor vehicle air conditioner, with a compressor which subdivides the refrigerant circuit into a high-pressure side and a low-pressure side. The method includes the steps of measuring the pressure and the temperature on the high-pressure side at time intervals, determining an assigned temperature using the measured pressure with the aid of a refrigerant-specific function, and determining a refrigerant undercooling value which can be evaluated as a measure of the refrigerant level by subtracting the measured temperature from the assigned one.

13 Claims, 1 Drawing Sheet

METHOD FOR MONITORING THE REFRIGERANT LEVEL IN AN AIR CONDITIONER

BACKGROUND OF THE INVENTION

1. Field of the Invention

The invention relates to a method for monitoring the refrigerant level in an air conditioner, and more specifically, to a method for monitoring the refrigerant level in an air conditioner having a compressor with a high pressure refrigerant circuit and a low pressure refrigerant circuit.

2. Description of the Related Art

DE 44 01 415 C1 describes a generic method for monitoring the refrigerant level in an air conditioner, the air conditioner having a compressor subdividing the refrigerant circuit into a high-pressure side and a low-pressure side. The pressure and the temperature are measured on the high-pressure side at time intervals, an assigned temperature is determined using the measured pressure with the aid of a refrigerant-specific function, and a refrigerant undercooling value Uw which can be evaluated as a measure of the refrigerant level is determined by subtracting the measured temperature from the assigned one. At least during prescribable operating phases of the air conditioner, use is made for the purpose of assessing the refrigerant level of a maximum value Mw which is set at the start of these operating phases to the last determined undercooling value Uw and is set in the course of this operating phase to a respectively newly determined undercooling value when the latter is greater than the maximum value Mw present at the corresponding instant.

In the case of this type of method for monitoring the refrigerant level in an air conditioner, it is disadvantageous that given a low outside temperature in the range below 15° C. the externally controlled compressor is driven at low par, with the result that the measured relative pressure on the high-pressure side is low. No result capable of further use is obtained in this range for the undercooling value determined therefrom.

The present invention is aimed at one or more of the problems identified above.

BRIEF SUMMARY OF THE INVENTION

The object of the invention is to improve a method for monitoring the refrigerant level in an air conditioner such that the refrigerant level can be optimally monitored even in the case of low outside temperatures.

According to the invention, the object is achieved by the features of claim 1. Advantageous refinements and developments of the subject matter of the invention are characterized by the features of the subclaims.

A substantial advantage of these refinements resides in that monitoring of the refrigerant level can be performed in the range of low outside temperatures.

BRIEF DESCRIPTION OF THE DRAWINGS

The invention is explained in more detail with the aid of an exemplary embodiment in conjunction with a description of the figures. In the drawing.

DETAILED DESCRIPTION OF THE INVENTION

Figure 1:
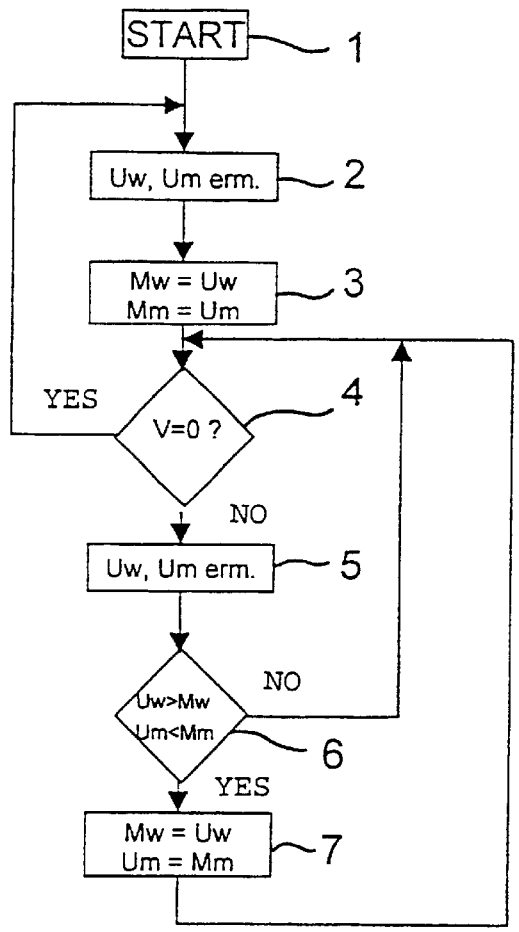
FIG. 1 shows a program flowchart of a section of a method for monitoring the refrigerant level in a motor vehicle air conditioner.

A program flowchart of a section of a method for monitoring the refrigerant level in a motor vehicle air conditioner is shown in FIG. 1.

The program is stored in an operating device of the air conditioner. The motor vehicle air conditioner on which the method is based is of conventional design including a controlled compressor. Such a compressor is not operated in a clock fashion, but continuously, and matches the delivered refrigerant quantity to the respective refrigeration demand by reducing the piston stroke in the compressor, something which avoids the shocks when starting a clocked, uncontrolled compressor. However, there is a loss of the information, used in the previously customary calculation of the undercooling value, on the magnitude of the refrigerant throughput at a given instant in the case of an active compressor. The method described in more detail below renders it possible for this instant of maximum delivery rate to be determined indirectly, and thus for a reliable conclusion to be drawn on the refrigerant level. This is based on the finding that the respectively determined undercooling value respectively decreases both with decreasing refrigerant quantity and with a low compressor output, and with the occurrence of disturbances in the system. It follows from this that in order to determine an undercooling value which can be used to assess the level, it is not necessary explicitly to determine an instant for a maximum compressor output.

In the case of the use of a controlled compressor, the delivered refrigerant quantity can be varied in a plurality of stages or continuously. Consequently, in the known method it is provided for the purpose of level monitoring for the undercooling value to be determined at time intervals until a quasi-stable state is detected for the latter, each, or a portion of the undercooling values being used for evaluation for the purpose of level monitoring without mutual comparison of the undercooling values. Controlled compressors operate at low power given low outside temperatures at which no cooling power, or only a slight one is required. A low pressure then prevails in the refrigerant, and this is correlated with a low boiling point. The associated undercooling value cannot be used to determine the refrigerant level. In the case of a refrigerant underfilling, the compressor attempts to increase the pressure in the refrigerant by increasing power. The method therefore fundamentally provides to use a maximum value Mw and a minimum value Mm, which are derived from undercooling values Uw, Um, determined at time intervals, according to a procedure illustrated in FIG. 1, in order to assess the refrigerant level. The difference between the minimum Mm and maximum undercooling value Mw is determined in the time interval concerned. In the case of a lack of refrigerant, an attempt is made to increase the pressure in the refrigerant by increasing the power of the compressor. This leads to an increase in the maximum value Mw. In the case of a well-filled air conditioner, there is no great difference between the minimum value Mm and maximum value Mw of the undercooling, and so the difference is slight. The absolute value of the maximum value Mw is high. When the conditioner starts to empty, the difference increases, the maximum value always still exceeding a prescribed threshold value. In the case of underfilling of the conditioner, no further increase in pressure is achieved even by increasing the power of the compressor. The maximum value undershoots the prescribed threshold value. The minimum value Mm and the maximum value Mw adapt to one another again. The difference Δ then undershoots a prescribed threshold value.

In a development of the invention for a motor vehicle air conditioner it is provided that in the case of a stationary vehicle the instantaneously determined undercooling value is simultaneously used immediately in each case as a measure of the refrigerant level, as is desired, in particular, in the case of maintenance work. This constitutes a useful statement on level, because with a stationary vehicle, that is to say when the driving speed is equal to zero, the condenser of the air conditioner is only slightly ventilated and the efficiency of the conditioner is therefore worse, for which reason the control compressor is more likely to operate at full power. Moreover, it is also possible to detect a gradual loss of refrigerant and the dropping, possibly resulting therefrom, in the level below a prescribed threshold value. Use is made of a maximum value compulsorily decremented in this way, and of an increased minimum value to monitor the level. This leads to a larger difference $\Delta$. In the case of a level which remains constant, this maximum value is automatically increased again from time to time by a detected higher undercooling value, and this minimum value is automatically reduced again by a detected smaller undercooling value. If such automatic lowering of the difference $\Delta$ does not occur in the further course of operation, this is therefore an indication that the level has decreased during this operating phase.

Furthermore, an underfilling alarm signal and/or a shut-down of the air conditioner are provided when an operating phase is present in which, for a preselected alarm and/or shut-down threshold period, the difference $\Delta$ is smaller than a preselected shut-down threshold value Sd, and the maximum value Mw undershoots a shut-down threshold value Sm. In this case, the threshold periods and threshold values for the alarm signal and the shutdown can be selected to be of the same or different magnitudes, a favourable implementation consisting in providing threshold periods of the same size and a larger threshold value for the alarm signal than for the shut down, with the result that in any event the alarm signal is produced before the air conditioner is shut down.

Alternatively, the possibility is provided of maintaining the running of the respective threshold period as long as the compressor is switched off or the vehicle is stationary, and of resetting it when the vehicle is parked, or the difference $\Delta$ is greater than the shut-down threshold value and the maximum value overshoots the corresponding threshold value, in order then to be able to restart the running of the threshold period.

Figure 2:
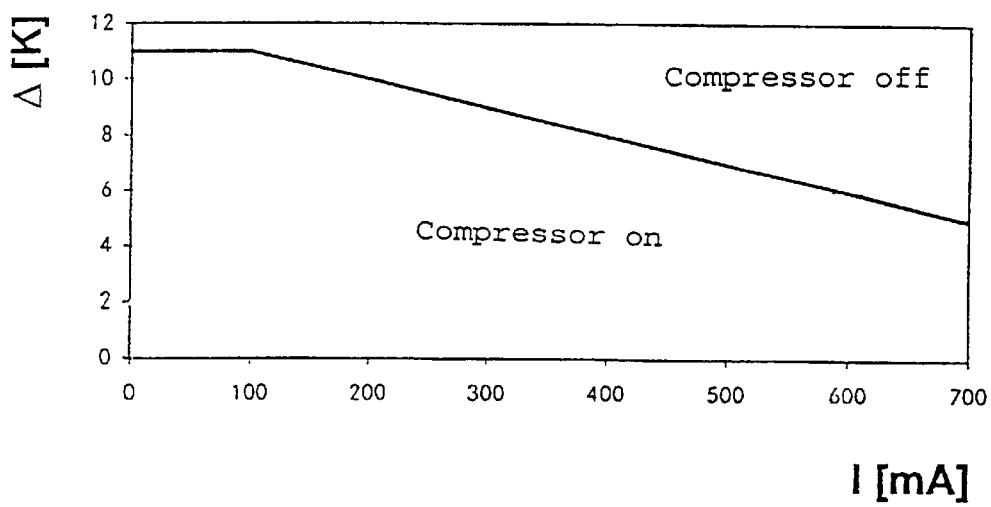
FIG. 2 shows a characteristic for shutting down the compressor in the event of refrigerant undercooling.

A characteristic of the compressor shutdown in the case of refrigerant underfilling is shown in FIG. 2. The difference $\Delta$ between the maximum value Mw and minimum value Mm is plotted against the compressor current. The compressor current replaces the maximum value Mw additionally required for assessing the refrigerant level. A maximum value is correlated with the compressor current. The compressor is shut down in the case of a difference $\Delta$ greater than 6 K and a compressor current of 600 mA. The compressor is shut down in the case of overshooting of a difference $\Delta$ of 11 K. Refrigerant underfilling prevails here. This characteristic must be determined for each vehicle, and can be called up in the air-conditioning operating device.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for monitoring the refrigerant level in an air conditioner, with a compressor which subdivides the refrigerant circuit into a high-pressure side and a low-pressure side, having the following steps:

measuring a pressure and a temperature on the high-pressure side at predetermined time intervals;

determining an assigned temperature using the measured pressure with the aid of a refrigerant-specific function; and determining a refrigerant undercooling value which can be evaluated as a measure of the refrigerant level by subtracting the measured temperature from the assigned one; characterized in that, at least during prescribable operating phases of the air conditioner use is made for the purpose of assessing the refrigerant level of a maximum value and a minimum value which are set at the start of this operating phase to the last determined undercooling values and are set in the course of this operating phase to the respectively newly determined undercooling values when the undercooling value is greater than the maximum value present at the corresponding instant and the undercooling value is smaller than the minimum value present at the corresponding instant.

2. Method according to claim 1 for a motor vehicle air conditioner, characterized in that in order to assess the refrigerant level:

use is made of the respectively last determined undercooling values and during operating phases fixed by the operating condition of vehicle speed equal to zero, and use is made of a maximum value and a minimum value during operating phases fixed by the operating condition of vehicle speed unequal to zero, which at the start of this operating phase are set to the undercooling values and last determined in the preceding operating phase with vehicle speed equal to zero, and in the course of this operating phase are set to respectively newly determined undercooling values when the undercooling value is greater than the maximum value present at the corresponding instant, and the undercooling value is smaller than the minimum value present at the corresponding instant.

3. A method, as set forth in claim 1, wherein the respective maximum value is decremented in each case by a preselected amount in preselected time intervals, and the respective minimum value is enlarged by a preselected amount.

4. A method, as set forth in claim 2, wherein the respective maximum value is decremented in each case by a preselected amount in preselected time intervals, and the respective minimum value is enlarged by a preselected amount.

5. A method, as set forth in claim 1, wherein the difference is formed between the maximum undercooling value and the minimum undercooling value which forms a measure of the refrigerant level together with the maximum value of the undercooling.

6. A method, as set forth in claim 2, wherein the difference is formed between the maximum undercooling value and the minimum undercooling value which forms a measure of the refrigerant level together with the maximum value of the undercooling.

7. A method, as set forth in claim 3, wherein the difference is formed between the maximum undercooling value and the minimum undercooling value which forms a measure of the refrigerant level together with the maximum value of the undercooling.

8. A method, as set forth in claim 4, wherein the difference is formed between the maximum undercooling value and the minimum undercooling value which forms a measure of the refrigerant level together with the maximum value of the undercooling.

9. A method as set forth in claim 5, wherein an underfilling alarm signal is produced and/or the air conditioner is shut down when an operating phase is present in which, for a preselected alarm and/or shut-down threshold period, the difference is smaller than a preselected shut-down threshold value, and the maximum value undershoots a shut-down threshold value.

10. A method as set forth in claim 6, wherein an underfilling alarm signal is produced and/or the air conditioner is shut down when an operating phase is present in which, for a preselected alarm and/or shut-down threshold period, the difference is smaller than a preselected shut-down threshold value, and the maximum value undershoots a shut-down threshold value.

11. A method as set forth in claim 7, wherein an underfilling alarm signal is produced and/or the air conditioner is shut down when an operating phase is present in which, for a preselected alarm and/or shut-down threshold period, the difference is smaller than a preselected shut-down threshold value, and the maximum value undershoots a shut-down threshold value.

12. A method as set forth in claim 8, wherein an underfilling alarm signal is produced and/or the air conditioner is shut down when an operating phase is present in which, for a preselected alarm and/or shut-down threshold period, the difference is smaller than a preselected shut-down threshold value, and the maximum value undershoots a shut-down threshold value.

13. A method, as set forth in claim 1 for a motor vehicle air conditioner, wherein an underfilling alarm signal is produced and/or the air conditioner is shut down when an operating phase is present in which, for a preselected alarm and/or shut-down threshold period, the difference is smaller than a preselected shut-down threshold value, the maximum value undershoots a shutdown threshold value, and wherein the running of the alarm and/or shut-down threshold period is maintained as long as the compressor is switched off or the vehicle speed is equal to zero, and is reset when the difference is greater than the shut-down threshold value, and the maximum value overshoots the corresponding threshold values, or the ignition is switched off.

* * * * *